Nov. 14, 1967  E. H. GUSTAFSON  3,352,326
PREFABRICATED DUCTS FOR AIR CONDITIONING SYSTEMS
Filed Oct. 5, 1964
FIG. 1
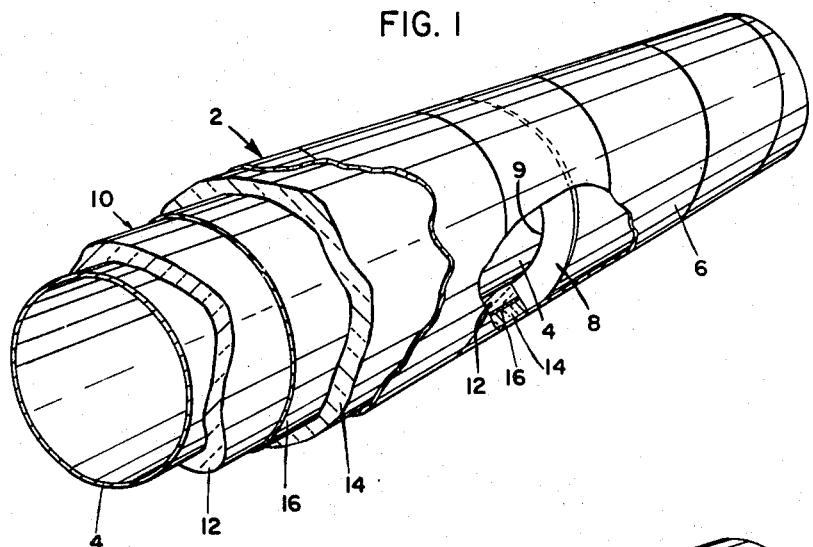
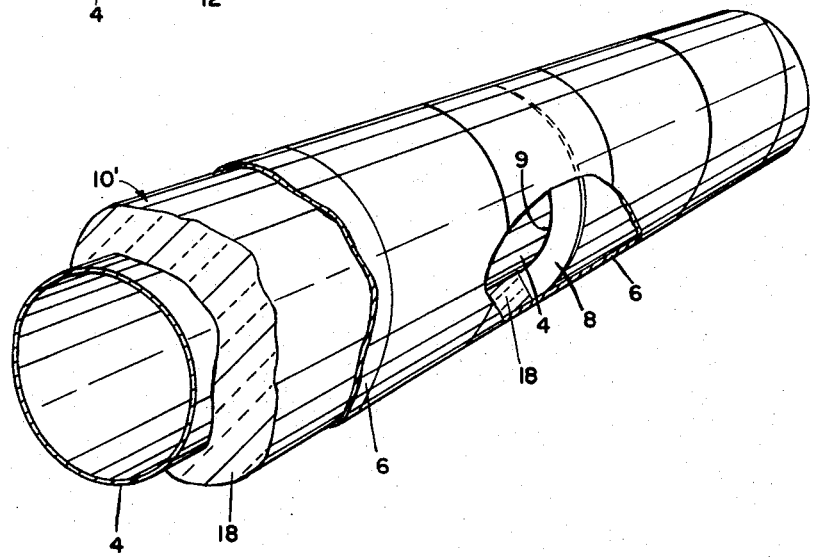
FIG. 2
INVENTOR.
EINAR H. GUSTAFSON.
BY
ATTORNEY.

United States Patent Office 3,352,326
Patented Nov. 14, 1967

3,352,326
PREFABRICATED DUCTS FOR AIR
CONDITIONING SYSTEMS
Einar H. Gustafson, Riverside, Ill., assignor to Carrier Corporation, Syracuse, N.Y., a corporation of Delaware
Filed Oct. 5, 1964, Ser. No. 401,467
2 Claims. (Cl. 138—149)

ABSTRACT OF THE DISCLOSURE

Prefabricated conduit for use with air conditioning systems with inner and outer concentric ducts spaced by one or more collar-like supports freely movable on the inner duct, with first and second insulating layers between the inner and outer ducts having at least one layer of metal foil therebetween.

---

This invention relates to prefabricated ducts for use with air conditioning systems, and more particularly, to an improved double-walled duct construction and method of assembly.

It is an object of the present invention to provide an improved double-walled duct particularly useful with air conditioning systems for conveying relatively high pressure fluid and gaseous mediums without leakage and with minimum loss of energy.

It is a further object of the present invention to provide an improved double-walled duct particularly suited for conveying fluids and gases subject to rapid and extreme changes in temperature and pressure.

It is a further object of the present invention to provide an inexpensive double-walled duct construction and method of assembly.

This invention relates to a prefabricated conduit for use with air conditioning systems comprising a first duct adapted to communicate with a source of the fluid, a second duct having an inner dimension greater than the outer dimension of the first duct, the first duct being spacedly disposed within the second duct, at least one collar-like support around the first duct adapted to maintain the first and second ducts in coaxial relationship, the support being dimensioned for relatively free movement on the first duct, and insulating means around the first duct on opposite sides of the collar-like support, the insulating means trapping the support therebetween to prevent movement of the support relative to the first duct.

The invention further relates to a method of fabricating a double-walled duct for use with air conditioning systems in which the steps consist in covering the outside surface of a first duct with insulation, wrapping metallic foil around the covering of insulation on the first duct, and covering the surface of the foil with insulation to form an insulated duct subassembly, and inserting the insulated duct subassembly within a second duct having an inside dimension slightly greater than the outside dimension of the insulated duct subassembly to form a double-walled duct.

Other objects will be apparent from the ensuing description and drawings in which:

FIGURE 1 is a view in perspective showing a duct section with portions broken away constructed according to one embodiment of this invention; and FIGURE 2 is a view in perspective showing a duct section with portions broken away constructed according to a second embodiment of this invention.

Referring to FIGURE 1 of the drawings, duct section 2 includes inner and outer tubular members or ducts 4, 6, respectively. The outer dimension of duct 4 is less than the inner dimension of duct 6.

Duct 4 communicates with a source of fluid or gaseous medium to be conveyed, such as air. Where the medium is under relatively high pressure, for example, 70 p.s.i., duct 4 is preferably a seamless metal tube or pipe. Outer duct 6 may be formed from metallic or nonmetallic material. In the construction shown, duct 6 comprises a spirally formed metal tube or pipe.

To maintain inner and outer ducts 4 and 6, respectively, in substantially coaxial relationship throughout the length thereof, rigid washer-like spacers 8 may be disposed therebetween at spaced intervals. Opening 9 in spacer 8 has a dimension slightly greater than the outer dimension of duct 4 to permit longitudinal movement of spacer 8 on duct 4 during assembly. The outer dimension of spacer 8 is slightly less than the inner dimension of duct 6 to permit longitudinal movement between spacer 8 and duct 6 during assembly.

Suitable insulating means is disposed between inner duct 4 and outer duct 6. In the embodiment of FIGURE 1, insulating means 10 comprises a first or inside layer of preformed conduit-like fiber glass insulation 12 and a second or outside layer of preformed conduit-like urethane insulation 14. The inner dimension of insulation 12 is slightly greater than the outer dimension of duct 4 to permit longitudinal movement of insulation 12 over duct 4 during assembly. Insulation 14 is dimensioned to permit longitudinal movement thereof over insulation 12 and to permit longitudinal movement of outer duct 6 thereover.

Where the over-all length of duct section 2 is relatively short, insulation 12, 14 is sized to extend between opposite ends of the duct section 2. Where the over-all length of duct section 2 is sufficient to require one or more spacers 8, insulation 12, 14 is sized to extend between the ends of the duct section and an adjacent spacer and between adjacent pairs of spacers where more than one spacer is used. Insulation 12, 14 holds spacers 8 against movement relative to ducts 4, 6. One or more layers of paper-like metal foil 16 are positioned between insulation 12, 14.

In the embodiment shown in FIGURE 2 of the drawings wherein like numbers refer to like parts, insulating means 10' is comprised of a single layer of preformed conduit-like insulation 18. Insulation 18, which may be urethane or fiber glass insulation, has an inner dimension slightly greater than the outer dimension of duct 4 and an outer dimension slightly less than the inner dimension of duct 6 to permit assembly of the duct section.

Duct section 2 may be assembled by positioning the insulating means 10 of FIGURE 1 or the insulating means 10' of FIGURE 2 on inside duct 4. Outside duct 6 is then slid over the insulated inside duct subassembly.

Where the over-all length of duct section 2 is such one or more spacers 8 are used, duct section 2 is assembled by first placing a segment of insulating means 10 or 10' on inside duct 4, moving a spacer 8 on inside duct 4 into engagement with the adjacent end of the insulating means segment, and then placing a second segment of insulating means 10 or 10' on inside duct 4 so that the end thereof engages spacer 8. Additional spacers and insulation segments are similarly placed over duct 4 until the entire axial length of duct 4 is covered. Outside duct 6 is then slid over the inside duct subassembly.

While I have described a preferred embodiment of the invention, it will be understood that the invention is not limited thereto since it may be otherwise embodied within the scope of the following claims.

I claim:

1. Prefabricated conduit for use in air conditioning systems comprising: a first duct adapted to communicate with a source of fluid; a second duct having an inner dimension greater than the outer dimension of said first duct, said first duct being spacedly disposed within said second duct; at least one collar-like support around said first duct adapted to maintain said first duct in coaxial relationship with said second duct, said support being dimensioned for relatively free movement on said first duct; and insulating means comprising first and second layers of insulation with at least one layer of metal foil therebetween, said insulating means being around said first duct on opposite sides of said support, said insulating means trapping said support therebetween whereby said support is held against longitudinal movement.

2. Prefabricated conduit according to claim 1 in which said second duct comprises a helically formed conduit.

References Cited
UNITED STATES PATENTS

| | | | |
|---|---|---|---|
| 426,199 | 4/1890 | Munsie | 138—149 X |
| 1,988,628 | 1/1935 | McDonald et al. | 138—149 X |
| 2,116,302 | 5/1938 | Chernosky | 138—149 X |
| 2,330,966 | 10/1943 | Gottwald et al. | 138—149 |
| 2,347,855 | 5/1944 | Varga | 138—149 X |

FOREIGN PATENTS

| | | |
|---|---|---|
| 517,787 | 3/1953 | Belgium. |
| 525,038 | 12/1953 | Belgium. |

LAVERNE D. GEIGER, *Primary Examiner.*

C. L. HOUCK, *Assistant Examiner.*